(12) United States Patent
Leonard et al.

(10) Patent No.: US 8,710,697 B2
(45) Date of Patent: *Apr. 29, 2014

(54) BI-LEVEL SWITCHING WITH POWER PACKS

(75) Inventors: Thomas W. Leonard, Tualatin, OR (US); Robert Hick, Newberg, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/191,271

(22) Filed: Jul. 26, 2011

(65) Prior Publication Data

US 2011/0278922 A1 Nov. 17, 2011

Related U.S. Application Data

(63) Continuation of application No. 12/397,271, filed on Mar. 3, 2009, now Pat. No. 8,008,802.

(51) Int. Cl.
*H02J 1/10* (2006.01)

(52) U.S. Cl.
USPC .................. 307/29; 307/150; 307/41

(58) Field of Classification Search
USPC ...................... 307/29, 41, 116, 150
See application file for complete search history.

(56) References Cited

U.S. PATENT DOCUMENTS

| | | |
|---|---|---|
| 3,604,180 A | 9/1971 | Wood |
| 4,009,051 A | 2/1977 | Kazis et al. |
| 4,368,455 A | 1/1983 | Menard |
| 5,051,607 A * | 9/1991 | Dalton .......... 307/141 |
| 5,237,207 A | 8/1993 | Kwiatkowski et al. |
| 5,489,827 A | 2/1996 | Xia |
| 5,610,448 A * | 3/1997 | Dattilo .......... 307/39 |
| 5,668,446 A | 9/1997 | Baker |
| 5,701,058 A | 12/1997 | Roth |
| 5,753,983 A | 5/1998 | Dickie et al. |
| 6,114,816 A | 9/2000 | Nuckolls et al. |
| 6,181,086 B1 | 1/2001 | Katyl et al. |

(Continued)

FOREIGN PATENT DOCUMENTS

| | | |
|---|---|---|
| JP | 2001-326083 A | 11/2001 |
| JP | 2003-347066 A | 12/2003 |
| JP | 2005-285542 A | 10/2005 |
| JP | 2009-016050 A | 1/2009 |

OTHER PUBLICATIONS

International Search Report and Written Opinion for PCT/US2010/026080, dated Oct. 20, 2010, 11 pages.

(Continued)

*Primary Examiner* — Fritz M Fleming
(74) *Attorney, Agent, or Firm* — Marger Johnson & McCollom PC

(57) ABSTRACT

An electrical power pack may include a first power switch and a cycle control to cycle between the first power switch and a second power switch. An electrical power pack may include a first power switch and a delay element to delay an operation of the first power switch. A power pack system may include a first power switch to operate in response to a constant-on control and a second power switch to operate in response to an automatic control. A power pack system may include a first power switch to operate in response to a manual-on control, and a second power switch to operate in response to an automatic-on control.

20 Claims, 6 Drawing Sheets

(56) References Cited

U.S. PATENT DOCUMENTS

| | | | |
|---|---|---|---|
| 6,222,191 B1 | 4/2001 | Myron et al. | |
| 6,275,163 B1 | 8/2001 | Bogorad et al. | |
| 6,390,647 B1 | 5/2002 | Shaefer | |
| 6,410,997 B1 | 6/2002 | Sjursen et al. | |
| 6,587,739 B1 | 7/2003 | Abrams et al. | |
| 6,789,917 B2 | 9/2004 | Parsons et al. | |
| 6,850,159 B1 | 2/2005 | Mudge | |
| 6,933,686 B1 | 8/2005 | Bishel | |
| 7,019,276 B2 | 3/2006 | Cloutier et al. | |
| 7,058,477 B1 | 6/2006 | Rosen | |
| 7,109,668 B2 | 9/2006 | Pogodayev et al. | |
| 7,122,976 B1 * | 10/2006 | Null et al. | 315/362 |
| 7,161,253 B2 | 1/2007 | Sodemann et al. | |
| 7,486,193 B2 | 2/2009 | Elwell | |
| 7,825,615 B2 | 11/2010 | Chen et al. | |
| 2002/0135476 A1 | 9/2002 | McKinney, Jr. et al. | |
| 2005/0254241 A1 | 11/2005 | Harwood | |
| 2006/0044152 A1 | 3/2006 | Wang | |
| 2006/0076908 A1 | 4/2006 | Morgan et al. | |
| 2006/0267566 A1 * | 11/2006 | Williams et al. | 323/282 |

OTHER PUBLICATIONS

"Bi-Level Switching", from www.lightingtaxdeduction.org/technologies/bi-level.htm, retrieved Mar. 2, 2009, 2 pages, NEMA.

Dilouie, C. "Bi-Level Switching Study Demonstrates Energy Savings", from www.aboutlightingcontrols.org/education/papers/2007_bilevel_switching.shtml, retrieved Mar. 2, 2009. 7 pages, Lighting Control Associaion.

"Power Packs: a guide to Watt Stopper power packs", from www.wattstopper.com, Jul. 2006, 8 pages, legrand® Watt Stopper brochure.

"Occupancy Sensors: Special Power Packs & Supplies", from www.wattstopper.com, retrieved Mar. 2, 2009, 1 page, Pub. No. 6805, legrand® Watt Stopper.

"Occupancy Sensors: BZ-150 Universal Voltage Power Pack", from www.wattstopper.com, retrieved Mar. 2, 2009, 2 pages, Pub. No. WS-07-27402, legrand® Watt Stopper.

"IntelliSight® Relay Power Packs, Dual Channel Fluorescent", Product Specifications, retrieved Mar. 2, 2009, 2 pages, Pub. No. 87-0638E, Lightolier® Controls of Philips Group.

"Classic Digital Control Station", Product Specifications, retrieved Mar. 2, 2009, 2 pages, Pub. No. 87-0682B, Lightoliere® Controls of Philips Group.

"IntelliSight® Relay Power Packs", Product Specifications, retrieved Mar. 2, 2009, 2 pages, Pub. No. 87-0636C, Lightolier® Controls of Philips Group.

"Daylight Harvesting Made Easy: Conserve Energy, Save Money, and Increase Productivity", Leviton® brochure, Sep. 2007, 12 pages, Leviton Manufacturing Co., Inc.

"Power Pack Series: OSP Power Pack, OSA Add-A-Relay", Mar. 2007, 2 pages, Leviton Manufacturing Co., Inc.

"Dual-Relay Decora Wall Switch Occupancy Sensor: ODSOD-ID", Jan. 2008, 8 pages, Leviton Manufacturing Co., Inc.

"Dual Relay Multi-Technology Wall Switch Occupancy Sensors", Aug. 1, 2008, 5 pages, Leviton Manufacturing Co., Inc. Lighting Management Systems.

Sensorswitch Specialty Power Packs, Sensor Switch, Inc., Wallingford, CT, Dec. 21, 2004.

* cited by examiner

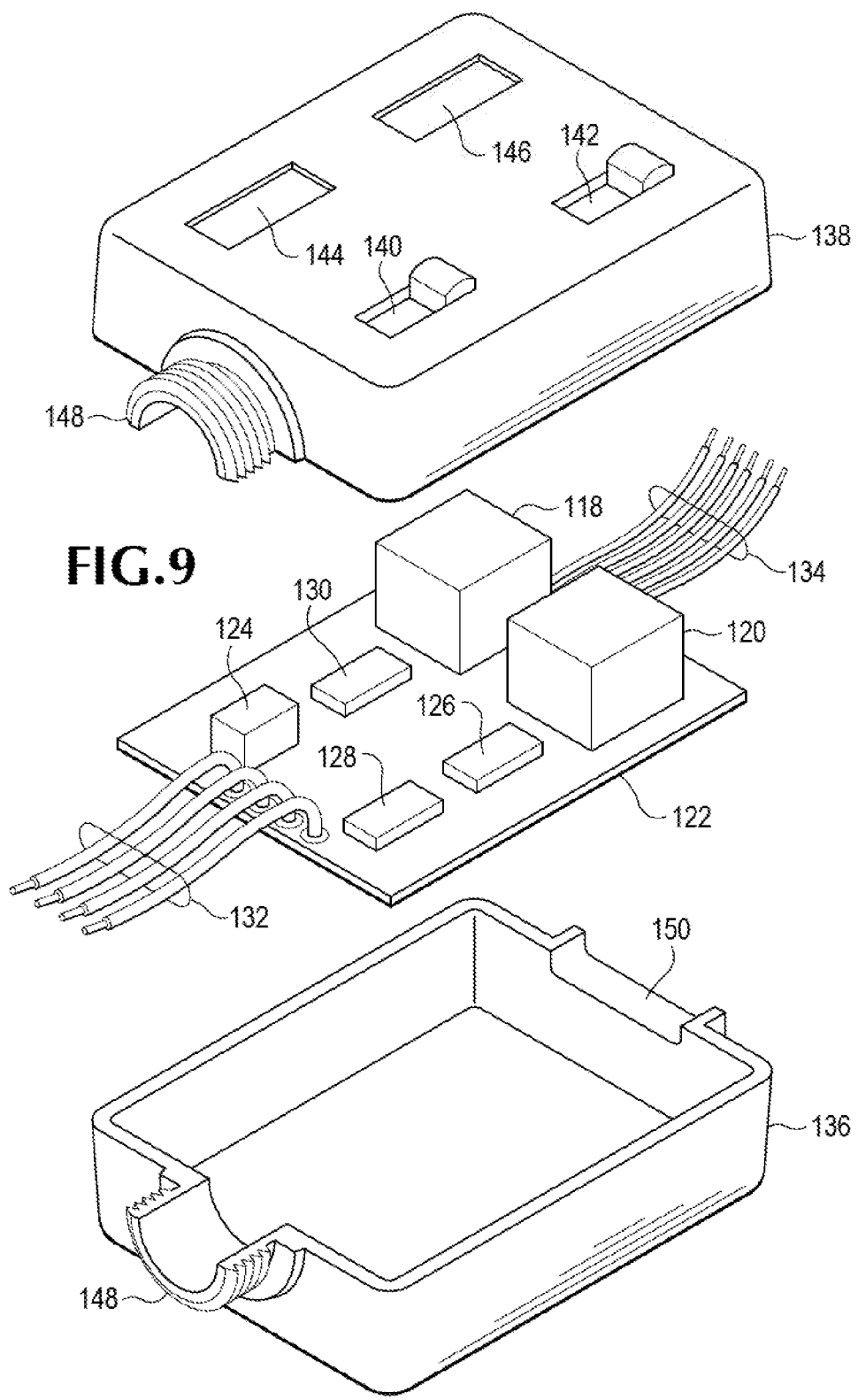

BI-LEVEL SWITCHING WITH POWER PACKS

RELATED APPLICATION

This application claims priority and is a divisional continuation application of U.S. patent application Ser. No. 12/397,271 titled BI-LEVEL SWITCHING WITH POWER PACKS, filed Mar. 3, 2009, which is incorporated by reference.

BACKGROUND

Bi-level switching of lighting loads enables building occupants to manually reduce the lighting load to facilitate energy conservation, occupant comfort, etc. Most states have adopted energy conservation codes that require some form of bi-level switching to provide building occupants the ability to reduce lighting loads by at least 50 percent in a reasonably uniform pattern. Some states have adopted energy conservation codes that demand even higher levels of energy conservation. For example, Title 24 of the California Code of Regulations requires that at least one of the lighting loads in a bi-level switching system must only be turned on manually.

One recognized method for bi-level switching involves controlling all of the lamps in a room with a common dimmer or multi-level power switching to enable the power to all of the lamps in the room to be reduced uniformly. Thus, the term bi-level switching may also be understood to also refer to methods involving multi-level switching or dimming. A second method involves dual switching alternate rows or groups of light fixtures, lamps within fixtures, etc. A third method is specific to 3-lamp lighting fixtures and involves separately switching the inner and outer lamps in one or more fixtures. A fourth method involves providing a separate switch or control for each lamp or light fixture in a room.

Although energy conservation codes specify how lighting systems must work at a high level, they provide no guidance on the actual implementation details. Moreover, energy conservation codes only specify minimum levels of functionality and energy conservation.

BRIEF DESCRIPTION OF THE DRAWINGS

FIG. 9 is an exploded view of an embodiment of a power pack according to the inventive principles of this patent disclosure.

DETAILED DESCRIPTION

Some of the inventive principles of this patent disclosure relate to the use of power packs to implement bi-level switching for lighting and/or other electrical loads in interior and/or exterior spaces. A power pack enables power to one or more loads to be controlled by one or more control signals. A power pack typically controls the flow of power to a load through a switch that is capable of switching relatively high voltages such as 120, 240 or 277 VAC. The control signals are typically implemented with relatively low-voltage signals such as 24 VDC. A power pack is usually packaged in a relatively compact enclosure and may include a power supply to convert high-voltage power to a low-voltage source for operating the control signals. A conduit connection is frequently provided to interface the power pack's high-voltage switch and power supply to a building's high-voltage wiring system.

Using a power pack to control a load may provide numerous advantages over other wiring techniques. For example, a power pack may be placed close to the load it controls, so the amount of high-voltage wiring may be reduced. This may reduce the time and expense required to install the system, and also reduces resistive power loss in the high-voltage wiring. The control signals can then be run as low-voltage wiring which is typically faster and less expensive to install, and is also safer for installers, maintainers and users of the system. The use of low-voltage control wiring may also reduce the time, expense and safety hazards associated with making future changes to the system, and may facilitate the integration with more sophisticated energy and building controls.

Figure 1:
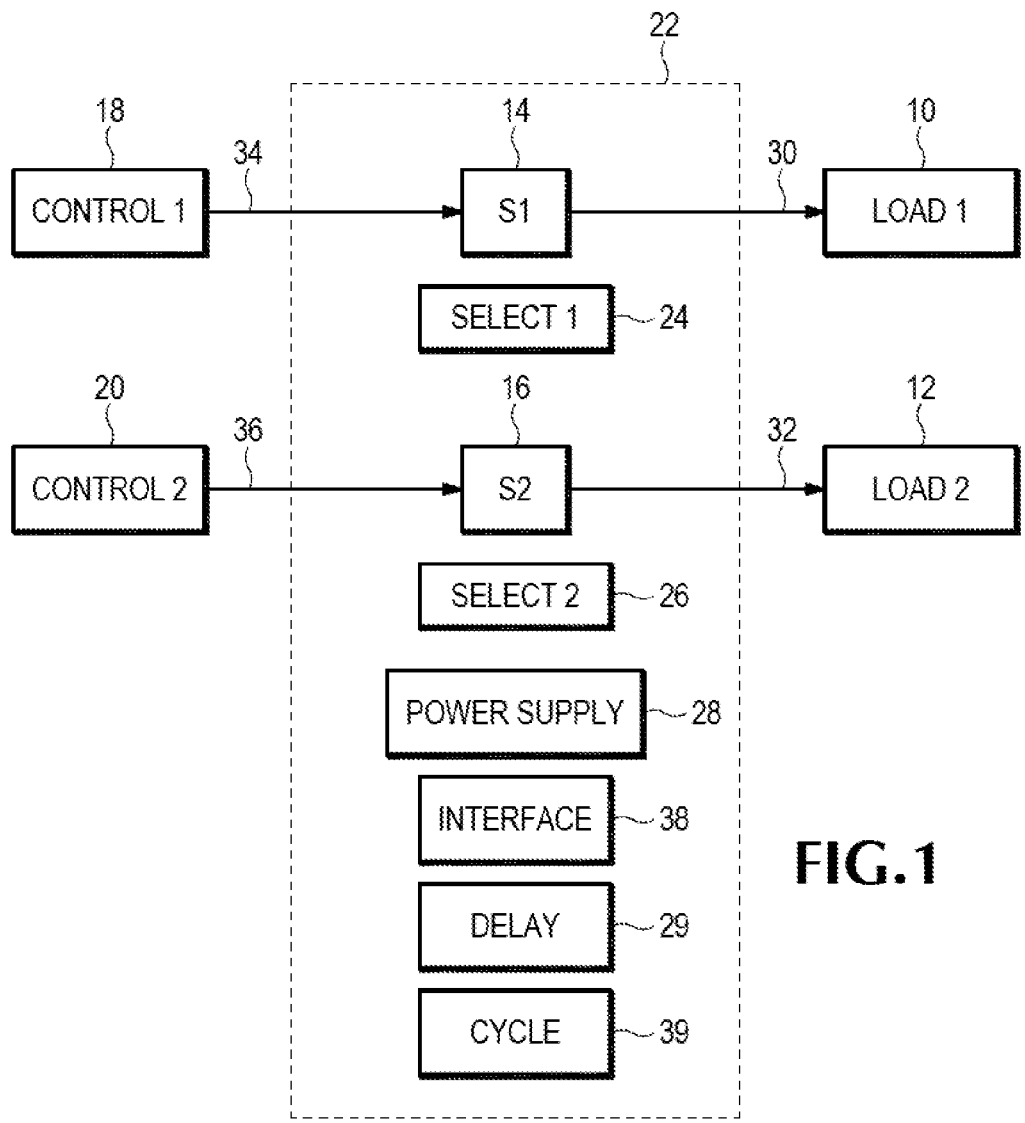
FIG. 1 illustrates an embodiment of a power pack system according to the inventive principles of this patent disclosure.

FIG. 1 illustrates an embodiment of a power pack system according to the inventive principles of this patent disclosure. The system of FIG. 1 includes first and second electrical loads 10 and 12 controlled by switches S1 and S2 (14 and 16) in response to controls 18 and 20. A first auto/manual select feature 24 may configure the manner in which switch S1 is controlled, and a second auto/manual select feature 26 may configure the manner in which switch S2 is controlled.

The power connections 30 and 32 may include any form of connection suitable for the flow of power to a load, for example, insulated conductors in free space or in a conduit, cable, or other raceway. The power connections may operate at common high-voltages such as 120, 240 or 277 VAC, or at other voltages such as 12 VDC which is commonly used for outdoor landscaping. Terminations may be made through screw terminals, wire leads, spring terminals, or any other suitable method.

The control connections 34 and 36 may include any form of connection suitable to provide control signaling, for example, low-voltage building wiring such as NEC Class 2 wiring. Alternatively, other forms of connections may be used, including wireless connections such as RF or infrared. Connections may also include network connections such as Control Area Network (CAN), Digital Addressable Lighting Interface (DALI), SectorNet™, LonWorks, etc.

The electrical loads 10 and 12 are located in, or arranged to serve, a common space and may include lighting loads such as incandescent, fluorescent or other types of lighting; motors for exhaust fans, ceiling fans, or other types of motor loads; heaters for space heating or other uses; actuators for dampers, doors or other types of building or environmental controls; etc.

One or more of the controls 18 and 20 may be located in, or arranged to serve, the space served by the electrical loads, and may include any form of hardwired or wireless controls. For example, the controls may include manual controls such as wall switches with pushbutton or toggle switches, electronic keypads, pendants, ceiling or wall stations with hand-held remotes, etc. The controls may also include automatic controls such as occupancy sensors including sensors based on passive infrared (PR) radiation, ultrasound (U/S), video, audio, microwaves, etc.; light sensors including photocells, reflective light sensors (RLS), video sensors, etc.; or other controls from security systems, building automation systems, etc.

The switches S1 and S2 may include any suitable form of isolated or non-isolated power switches including air-gap relays, solid state relays, or other switches based on SCRs, Triacs, transistors, etc. The switches may provide power switching in discrete steps such as off/on switching, with or without intermediate steps, or continuous switching such as dimming control. The power connections to the switches may include a common neutral terminal with two switched hot terminals, an isolated pair of terminals for each switch, or any other suitable configuration.

The auto/manual select features 24 and 26 may be implemented with selector switches, wire connections, network connections, etc.

Switches S1 and S2 may be contained in separate power packs or in a common power pack 22 as described below. Each power pack may be fully or partially enclosed in an enclosure made of metal, plastic, etc., or a combination thereof. An enclosure may include a conduit connection or other type of interface to connect the power pack to a building wiring system. For example, the enclosure may include an electrical nipple connector to attach the power pack to a junction box, electrical fixture, conduit or other raceway. An enclosure may also be sized and shaped to fit inside an electrical enclosure, junction box, fixture, etc.

A power pack may also include one or more power supplies 28 to operate the controls 18 and 20. For example, a linear or switching power supply may be used to convert high-voltage AC power to low-voltage DC power for operating occupancy sensors, photosensors, etc.

A power pack may also include one or more interfaces 38 to other systems or components. For example, inputs and/or outputs may be provided to heating, ventilation and air conditioning (HVAC) systems, security systems, reporting systems, building automation systems, etc. Inputs and/or outputs may be provided for daylight harvesting components or systems, central timers or timer systems, other energy management systems, etc. Connections to an interface may be through wired or wireless connections and may include contact closures, analog voltage or current signaling, e.g., 0-10 volts, 4-20 mA, etc., network connections such as Sector-Net™ or other networks, etc.

A power pack may also include one or more delay elements 29 to delay the operation of one or more of the switches in response to one or more of the controls.

A power pack may also include one or more cycle controls 39 to cycle between operation of one or more of the switches in response to one or more of the controls.

The system of FIG. 1 may include countless variations according to the inventive principles of this patent disclosure, and some embodiments may include only a subset of the features described herein. For example, in some embodiments, a system may have two switches in a single power pack with a common power supply for operating the controls. In other embodiments, the system may have two switches in separate power packs, only one having a power supply to operate both controls. As another example, in some embodiments, only a single control 18 or 20 may be used to control both switches. In other embodiments, two controls may be included for respective switches, but one or each control may partially or completely control the other load. Any of the control features may be implemented with hardware, software, firmware, etc., or any combination thereof. Control logic for implementing various features may be located in control apparatus including wall units, wall switches, ceiling units, etc. or in power packs, separate control units, etc. Moreover, the logic may be distributed throughout any such apparatus.

Figure 2:
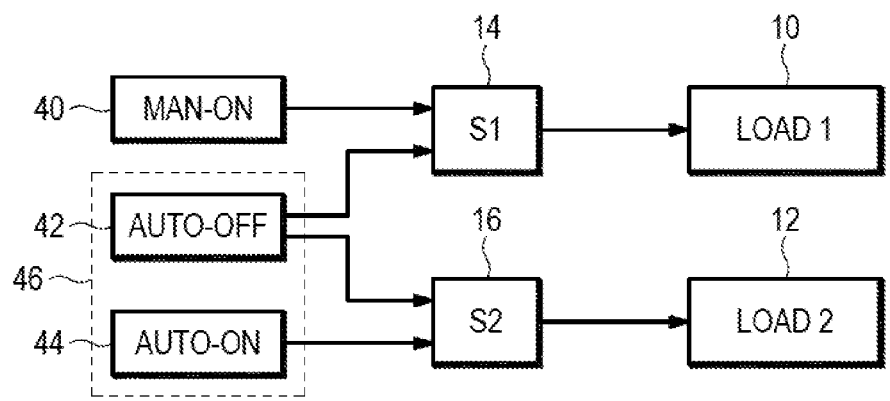
FIG. 2 illustrates another embodiment of a power pack system according to the inventive principles of this patent disclosure.

FIG. 2 illustrates another embodiment of a power pack system according to the inventive principles of this patent disclosure. In the embodiment of FIG. 2, two electrical loads 10 and 12, which are located in or arranged to serve a common space, are controlled by two switches 14 and 16. The system includes a manual-on feature 40 to turn the first switch S1 on, an automatic-on feature 44 to turn the second switch S2 on, and an automatic-off feature 42 to turn both switches S1 and S2 off. The automatic on and off features may be associated with a control apparatus 46 such as an occupancy sensor, daylight harvesting system, etc. The embodiment of FIG. 2 may further include a manual off feature to turn S1 off. One or more manual override features may be associated with the automatic on and off features to turn switch S2 on and/or off manually.

Figure 3:
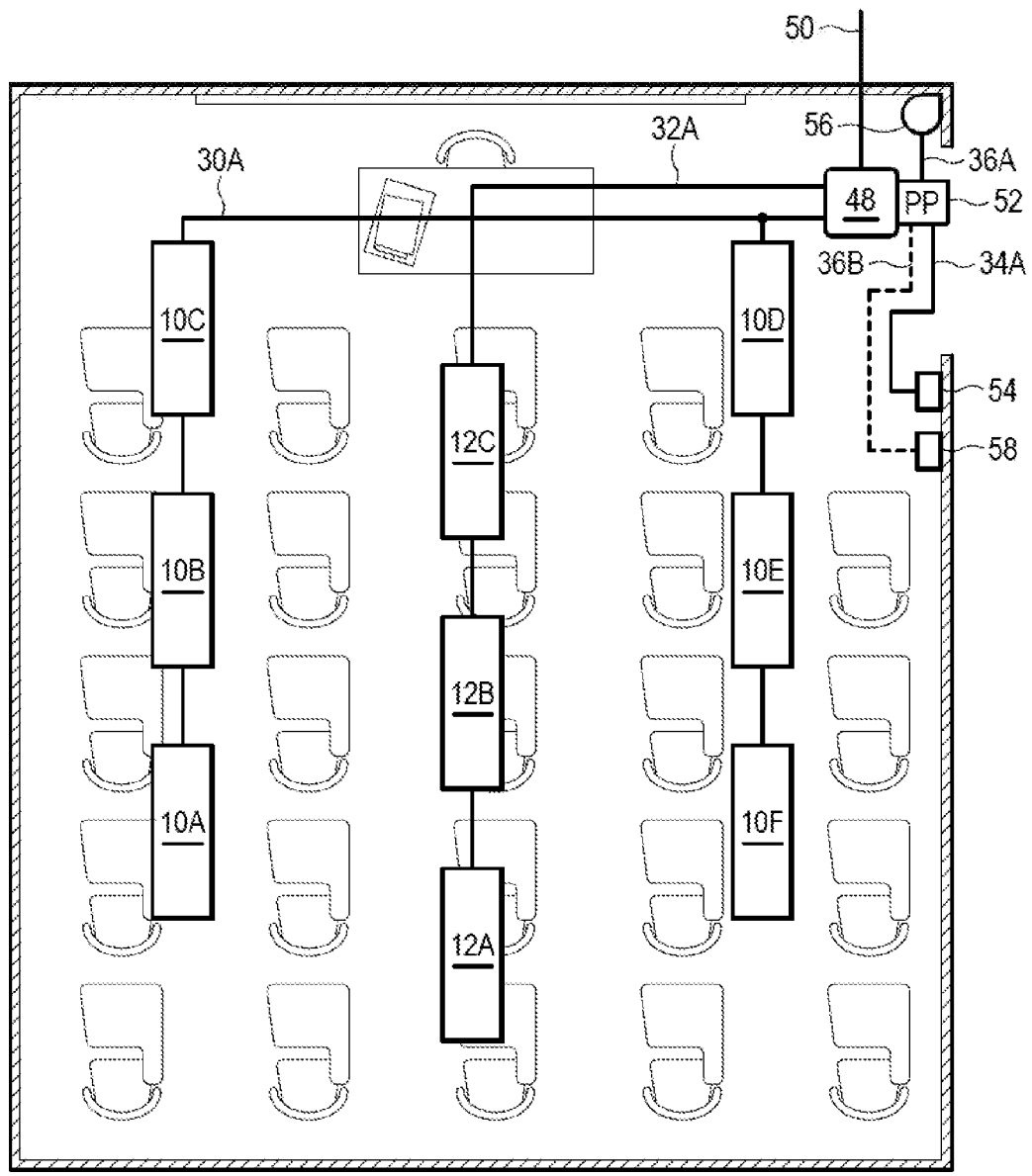
FIG. 3 illustrates another embodiment of a power pack system that demonstrates some possible implementation details of the embodiment of FIG. 2.

FIG. 3 illustrates another embodiment of a power pack system that demonstrates some possible implementation details of the embodiment of FIG. 2. The system of FIG. 3 is directed to a classroom for purposes of illustration, but the inventive principles may be applied to other rooms or spaces as well. A first group of overhead lighting fixtures (or luminaires) 10A-10F is connected in parallel to form a first lighting load that is wired into a junction box 48 through power connection 30A. A second group of overhead lighting fixtures 12A-12C is connected in parallel to form a second lighting load that is also wired into the junction box through power connection 32A. A branch circuit 50 provides power to the junction box in a suitable form such as 120, 240 or 277 VAC.

A power pack 52 includes two air-gap relays to control the power to the first and second lighting loads. The power pack also includes a power supply to provide a suitable voltage such as 24 VDC to operate controls. The power pack is connected to the junction box through a conduit-type connection to facilitate the wiring of the lighting loads to the switches in the power pack.

A manual on control 54 such as a low-voltage wall switch is connected to the power pack through any suitable control connection 34A which may be, for example, a 24 VDC hard-wired connection. An occupancy sensor 56, which in this example may be a wall mounted sensor, is connected to the power pack through any suitable control connection 36A which may be, for example, another 24 VDC hard-wired connection.

In operation, the system may initially begin with both groups of lights de-energized when no occupants are in the classroom. Upon sensing one or more occupants in the room, a control signal from the occupancy sensor 56 causes the second switch in the power pack to energize the second group of lights 12A-12C. If the light from the second group provides adequate illumination, the system may remain in this state until the occupancy sensor determines that there are no occupants in the room, at which time the control signal from the occupancy sensor 56 causes the power pack to de-energize the second group of lights.

If, however, the light from the second group does not provide adequate illumination, an occupant may actuate the manual on control 54 which causes the power pack to energize the first group of lights 10A-10F. When the occupancy sensor 56 determines that all occupants have left the room, it signals the power pack to de-energize both the first and second groups of lights.

A manual-off override may be provided to the manual-on control 54 to enable the first group of lights to be toggled on and off at will by an occupant. A manual override control 58 for the second group of lights may be connected to the power pack through a control connection 36B to enable an occupant to manually override the occupancy sensor 56. The manual override may provide manual-on, manual-off or manual-on/off control of the second group of lights.

Logic to implement the manual and automatic controls may be located anywhere in the system. For example, with the point-to-point control wiring shown in FIG. 3, it may be advantageous to locate the control logic in the power pack 52. Alternatively, control logic may be located in the first manual control 54, the occupancy sensor 56, or the second manual control 58. In either of these examples, it may be advantageous to arrange the control connections in a daisy-chain or multi-drop configuration with the power pack, or any combination of connection methods. As another alternative, logic to implement the controls may be distributed throughout the components of the system. The logic may be implemented in hardware, software, firmware, or any combination thereof.

Though shown in a single power pack 52, the switches to control the groups of lights may be distributed in multiple power packs. Any power pack may be connected to, or located in, the junction box 48, or connected to, or located in, one or more junction boxes or conduits at any point in the system. Further, one or more power packs may be attached to, or located in, any of the light fixtures. Likewise, any control logic may be distributed between multiple power packs.

Moreover, the embodiment of FIGS. 2 and 3 may be implemented or supplemented with any or all of the features described above in the embodiment of FIG. 1, as well as any other embodiments described herein. Likewise, any of the features described in the context of FIGS. 2 and 3 may be used with the embodiment of FIG. 1, as well as any other embodiments described herein.

Figure 4:
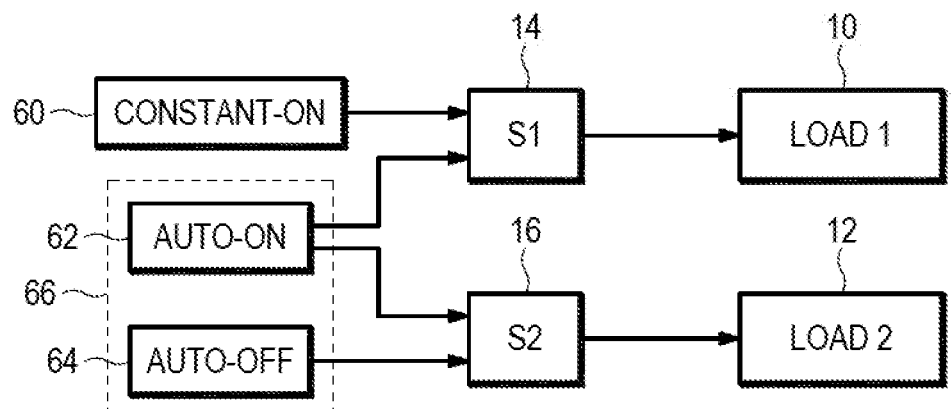
FIG. 4 illustrates another embodiment of a power pack system according to the inventive principles of this patent disclosure.

FIG. 4 illustrates another embodiment of a power pack system according to the inventive principles of this patent disclosure. In the embodiment of FIG. 4, the first switch S1 may be controlled by a constant-on feature 60, while the second switch S2 may be controlled by automatic-on and automatic-off features 62 and 64. The first and second switches may be included in the same or separate power packs. In some embodiments, one or more occupancy sensors 66 may be used to provide the automatic-on and automatic-off features. Such an arrangement may be advantageous for hallways, stairwells, safety routes, and any other spaces where a minimum amount of illumination may always be required for reasons of safety, security, etc. The automatic-on and automatic-off features provide a normal level of lighting, for example, if an occupant is sensed in the space. However, having the first load constantly energized may provide minimum background lighting if the second switch or load fails, or if an occupancy sensor fails to detect an occupant in the space.

In some embodiments, a constant-on feature may cause the first load to remain on at all times that power is available to the system. In other embodiments, a constant-on feature need not be strictly on at all times, as exceptions may be made for daylight harvesting, maintenance to replace lamps, security systems that may guarantee the space is unoccupied at certain times, time-clock based systems, etc. Thus, in this context, constant-on refers to a control that operates without regard to the detected presence or actions of occupants in the space served by the load.

In some embodiments, the automatic-on and automatic-off features may be partially or completely replaced by manual-on and/or manual-off features, or they may be supplemented by manual-on and/or manual-off override features. Control logic may be used to implement all of the control features in the embodiment of FIG. 4, and such logic may be located in the power pack or packs, in apparatus that implements the constant-on and automatic-on/off controls, or distributed between any of these locations. The logic may be implemented with hardware, software, firmware, etc. or any combination thereof. Hardware for the control features may be connected in a point-to-point, multi-drop, daisy-chain, etc. arrangement or any combination thereof.

Moreover, the embodiment of FIG. 4 may be implemented or supplemented with any or all of the features described in any other embodiments described herein. Likewise, any of the features described in the context of FIG. 4 may be used with any other embodiments described herein.

Figure 5:
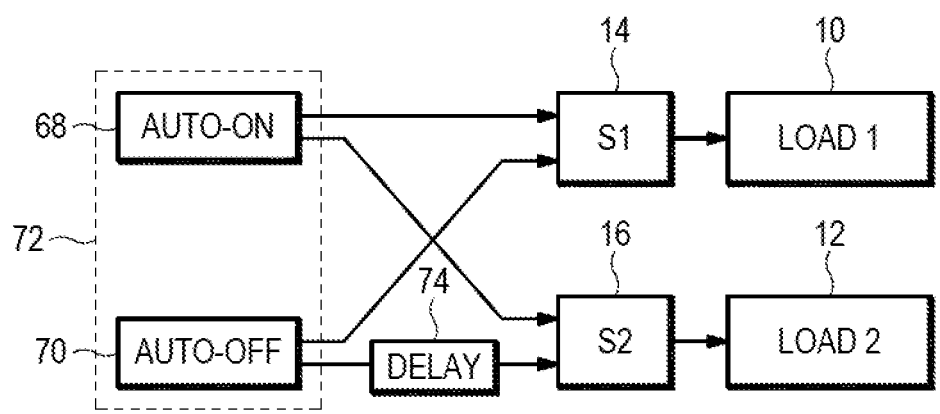
FIG. 5 illustrates another embodiment of a power pack system according to the inventive principles of this patent disclosure.

FIG. 5 illustrates another embodiment of a power pack system according to the inventive principles of this patent disclosure. The embodiment of FIG. 5 includes an automatic-on feature 68 to turn on both switches S1 and S2, and therefore, both loads 10 and 12. An automatic-off feature 70 turns off switch S1 directly, but turns off switch S2 through a delay element 74. The automatic-on and automatic-off features may be realized, for example, with one or more occupancy sensors. The first and second switches may be included in the same or separate power packs.

In some embodiments, the automatic-on and automatic-off features may be partially or completely replaced by manual-on and/or manual-off features, or they may be supplemented by manual-on and/or manual-off override features. In some embodiments, an additional delay element may be included to provide a delay feature for the first switch S1. Control logic may be used to implement all of the control features in the embodiment of FIG. 5, and such logic may be located in the power pack or packs, in apparatus that implements the constant-on and automatic-on/off controls, or distributed between any of these locations. The logic may be implemented with hardware, software, firmware, etc. or any combination thereof. Hardware for the control features may be connected in a point-to-point, multi-drop, daisy-chain, etc. arrangement or any combination thereof.

Moreover, the embodiment of FIG. 5 may be implemented or supplemented with any or all of the features described in any other embodiments described herein. Likewise, any of the features described in the context of FIG. 5 may be used with any other embodiments described herein.

Figure 6:
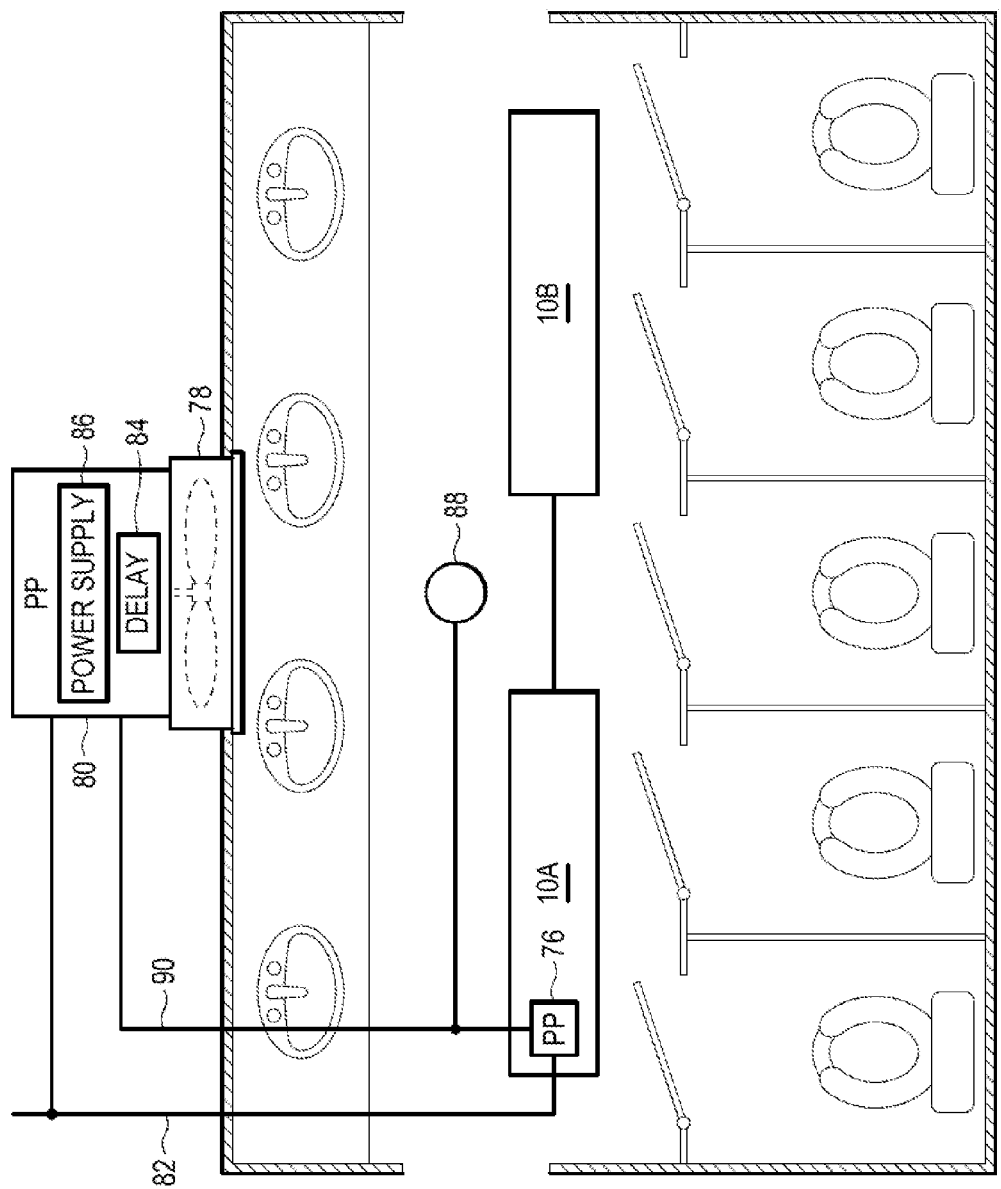
FIG. 6 illustrates another embodiment of a power pack system that demonstrates some possible implementation details of the embodiment of FIG. 5.

FIG. 6 illustrates another embodiment of a power pack system that demonstrates some possible implementation details of the embodiment of FIG. 5. The system of FIG. 6 is directed to a restroom for purposes of illustration, but the inventive principles may be applied to other rooms or spaces as well. A group of overhead lighting fixtures 10A-10B is connected in parallel to form a lighting load. The lighting load is controlled by a first switch in a first power pack 76 which, in this example, is located inside the first lighting fixture 10A. An exhaust fan 78 is controlled by a second switch in a second power pack 80 which, in this example, is attached directly to the exhaust fan. A branch circuit 82 provides power to both power packs at a suitable voltage such as 120, 240 or 277 VAC, etc. Alternatively, the power packs may be fed by separate branch circuits. For example, the lighting load may be fed by a 277 VAC branch circuit, while the fan load is fed by a 120 VAC branch circuit.

The second power pack 80 includes a power supply to operate controls such as a ceiling mounted occupancy sensor 88. The first and second power packs 76 and 80, as well as the occupancy sensor 88 are connected in a multi-drop arrangement through a control bus 90. The second power pack also includes a delay element 84 which delays the turn-off of the second switch and exhaust fan after receiving an off signal from the occupancy sensor.

In operation, the system may initially begin with the exhaust fan and lights de-energized when no occupants are in the restroom. Upon sensing one or more occupants in the room, a control signal from the occupancy sensor 88 causes both switches in power packs to energize the exhaust fan and lights. The exhaust fan and lights remain energized as long as the occupancy sensor determines that at least one occupant is in the room. When the occupancy sensor determines that there are no occupants in the room, the control signal from the occupancy sensor causes the first power pack 76 to de-energize lights. Although the second power pack 80 receives the unoccupied signal at the same time as the first power pack 76, the delay element 84 causes the second power pack to keep the exhaust fan energized for a predetermined time delay, which may be set to any suitable value.

In some embodiments, the power packs 76 and 80 may be combined into a single power pack which may be located at any of the loads, at a junction box, etc. A combined power pack may include two or more power switches, a power supply, a delay element, etc. Alternatively, one or more delay elements may be implemented as separate components, for example, an in-line component connected in series with a control input to a power pack, or as an add-on component to a power pack, occupancy sensor, etc.

In some embodiments, the automatic-on and automatic-off features may be partially or completely replaced by manual-on and/or manual-off features, or they may be supplemented by manual-on and/or manual-off override features. Control logic may be used to implement all of the control features in the embodiment of FIG. 6, and such logic may be located in the power pack or packs, in apparatus that implements the constant-on and automatic-on/off controls, or distributed between them. The logic may be implemented with hardware, software, firmware, etc. or any combination thereof. Hardware for the control features may be connected in a point-to-point, multi-drop, daisy-chain, etc. arrangement or any combination thereof.

The embodiment of FIG. 6 may be implemented or supplemented with any or all of the features described in any other embodiments described herein. Likewise, any of the features described in the context of FIG. 6 may be used with any other embodiments described herein.

Figure 7:
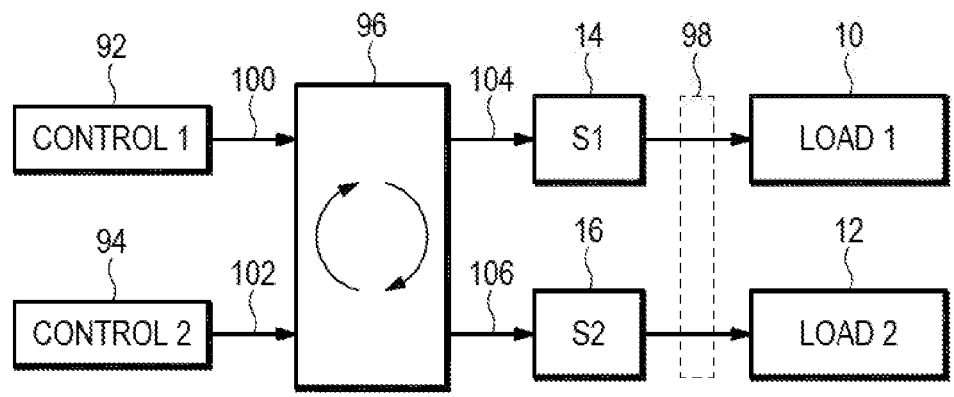
FIG. 7 illustrates another embodiment of a power pack system according to the inventive principles of this patent disclosure.

FIG. 7 illustrates another embodiment of a power pack system according to the inventive principles of this patent disclosure. The embodiment of FIG. 7 includes two electrical loads 10 and 12, which are located in or arranged to serve a common space, are controlled by two switches 14 and 16 in response to controls 92 and 94, which are also located in or arranged to serve the common space. The first and second switches may be included in the same or separate power packs.

The embodiment of FIG. 7, also includes cycle control 96 which may cause the functionality of switches S1 and S2 to change or be permuted over time. For example, the control connections 100 and 102 from controls 92 and 94 may initially be coupled to control connections 104 and 106 to switches S1 and S2, respectively. The cycle control 96, however, may later cause connection 100 to be coupled to connection 106 and connection 102 to be coupled to connection 104. These changes may be trigged by various types of events. For example, the functions of the switches S1 and S2 may be cycled on a period time basis, for example, every few days, weeks, months, etc. Alternatively, the functions may be cycled each time one or both of the switches is actuated, or every second, third, etc. time one or both of the switches is actuated.

Though shown as connections in FIG. 7, the cycling functionality does not need to be implemented by actually switching different control signals. For example, in some embodiments, all of the control functionality may be implemented with centralized control logic that receives appropriate inputs from Control 1 and Control 2 and drives switches S1 and S2 accordingly. The logic may be implemented with hardware, software, firmware, etc., or any combination thereof.

In some embodiments, the cycle control functionality may be located downstream of the switches, for example with additional switches in location 98 as shown in FIG. 7.

Figure 8:
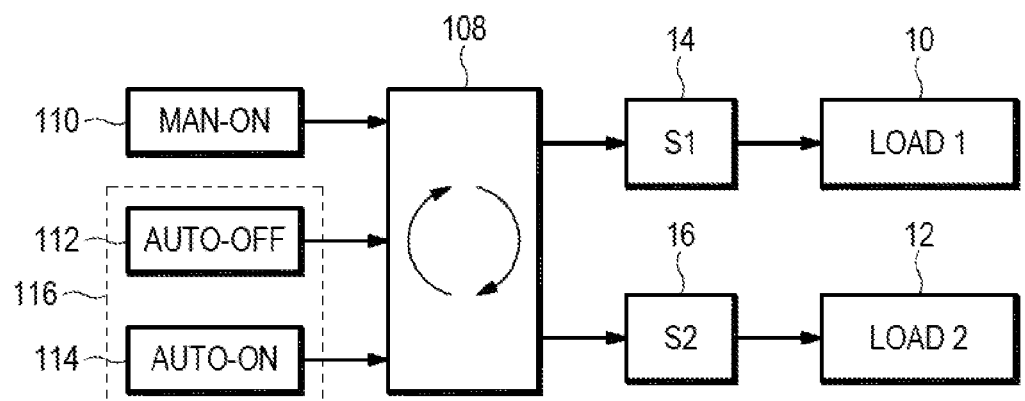
FIG. 8 illustrates another embodiment of a power pack system that demonstrates some possible implementation details for the embodiment of FIG. 7.

FIG. 8 illustrates another embodiment of a power pack system that demonstrates some possible implementation details for the embodiment of FIG. 7. The system of FIG. 8 includes two electrical loads 10 and 12, which in this example, may be two separate lighting loads located in or arranged to serve a common space. The lighting loads are controlled by two switches 14 and 16 which may be included in the same or separate power packs.

Cycle control 108 controls switches S1 and S2 in response to inputs received from a manual-on control 110, an automatic-off control 112, and an automatic-on control 114. The manual-on control 110 may be implemented as, for example, a low voltage wall switch. The automatic-off control 112, and automatic-on control 114 may be implemented, for example, as part of one or more occupancy sensors 116.

In operation, the system may initially begin with both lighting loads de-energized when no occupants are in the space. Upon sensing one or more occupants in the space, a control signal from the occupancy sensor 116 causes the cycle control 108 to turn on the second switch S2 to energize the second lighting load 12. If the light from the second lighting load provides adequate illumination for the space, the system may remain in this state until the occupancy sensor determines that there are no occupants in the room, at which time the control signal from the occupancy sensor causes the cycle control 108 to turn off the second lighting load. If the light from the second lighting load does not provide adequate illumination, an occupant may actuate the manual-on control 110 which causes the cycle control 108 to energize the first lighting load 10. When the occupancy sensor determines that all occupants have left the room, it signals the cycle control to de-energize both the first and second lighting loads.

Upon sensing one or more occupants in the space again, the occupancy sensor 116 again sends an occupied signal to the cycle control 108. This time however, the cycle control energizes the first lighting load rather than the second. Now, if the manual-on control 110 is activated, the cycle control energizes the second lighting load. That is, the cycle control 108 cycles between using the first and second lighting loads as the primary and secondary lighting loads, respectively.

In various embodiments, the manner in which the cycle control cycles the first and second lighting loads between primary and secondary operation can vary. For example, in one embodiment, cycling can occur each time the occupancy sensor turns on the primary lighting load. In another embodiment having a manual-off feature to complement the manual-on feature, cycling can occur each time the secondary load is switched off. In other embodiments, cycling can occur after a fixed or adaptable number of on/off sequences of the manual-on feature, the auto-on feature, the auto-off feature, or any other events or combinations thereof. In yet other embodiments, cycling can occur after predetermined or adaptable time periods, e.g., days, weeks, months, etc. In still other embodiments, cycling can occur after a predetermined or adaptable amount of run-time for one or more lamps, ballasts, motors, etc.

An advantage of cycling between different switching patterns for loads is that it may lead to more uniform and/or extended life for the loads and/or switches, etc. For example, cycling through different lighting fixtures as the primary fixture(s) may extend lamp life and/or provide more consistent illumination by causing lamps in different fixtures to age more evenly.

The embodiments of FIGS. 7 and 8 may be implemented or supplemented with any or all of the features described in any other embodiments described herein. Likewise, any of the features described in the context of FIGS. 7 and 8 may be used with any other embodiments described herein.

FIG. 9 is an exploded view of an embodiment of a power pack according to the inventive principles of this patent disclosure. The embodiment of FIG. 9, or variations thereof, may implement any of the features described in this patent disclosure.

Two power switches 118 and 120 may be mounted on a circuit board 122, which may also serve as a chassis for other components such as one or more power supplies 124 for operating controls, and one or more interfaces 126, delay elements 128, cycle controls 130, etc. Power leads 132 for input power, power connections to the power switches, etc. may be connected to the circuit board at one end. Control leads 134 for connections for control features may be connected to the circuit board at the other end.

The circuit board and other components may be packaged in an enclosure having two housing halves 136 and 138. A conduit connection 148 molded into the housing halves provides a mechanical connection to a building wiring system at a junction box, light fixture, or other electrical enclosure or raceway. An opening 150 in the housing or other port enables the control leads or other forms of control connections to be made to the circuit board.

Accommodations for various adjustments, inputs, etc. may be made through or on the housing as shown in FIG. 9, on the circuit board, or in any other suitable manner. In the example of FIG. 9, the housing includes selector switches 140 and 142 for selecting between automatic and manual control for the two power switches. In other embodiments, select functions may be implemented though wire connections, network interfaces, etc. One or more inputs 144 for adjusting one or more delay elements may include a DIP switch, trim-pot, rotary switch, etc. One or more inputs 146 for adjusting one or more cycle controls may also include a DIP switch, trim-pot, rotary switch, etc.

The one or more interfaces 126 may accommodate any of the interface features disclosed herein including, for example, relays for signaling HVAC systems, network interfaces for communication networks, connections to security systems, building management systems, daylight harvesting systems, etc.

Various embodiments may include or leave out any of the features disclosed herein. Moreover, embodiments may include multiples of various features, for example, three or more power switches, two or more interfaces, etc.

Although shown as separate components in FIG. 9, the features may be embodied in any suitable form. For example, in some embodiments, the one or more delay elements 128, one or more cycle controls 130, etc., may be implemented with a single microcontroller that integrates all of the control functionality of the power pack. In other embodiments, various features may be implemented with separate components that may be included or left off of the circuit board depending on the amount of functionality required, thereby allowing a single circuit board to be used for multiple versions.

The inventive principles of this patent disclosure have been described above with reference to some specific example embodiments, but these embodiments can be modified in arrangement and detail without departing from the inventive concepts. For example, some of the embodiments have been described in the context of lighting loads, but the inventive principles apply to other types of electrical loads as well. As another example, some of the embodiments have been described in the context of interior building spaces, but the inventive principles apply to exterior or hybrid spaces as well. Such changes and modifications are considered to fall within the scope of the following claims.

The invention claimed is:

1. A system comprising:
a first power switch disposed to energize a first load in response to a first control;
a second power switch disposed to energize a second load in response to a second control; and
a cycle control responsive to one of the first and second controls to cycle alternately between operation of one or more of the first and second switches to designate which of the first and second load acts as a primary load;
where the first and second power switches are included in one or more power packs that are adapted to connect the first and second power switches to a building wiring system to control the flow of power from one or more sources outside of the power pack to the first and second loads.

2. The system of claim 1 where the one or more power packs include the cycle control.

3. The system of claim 1 where the cycle control is adapted to cycle between operation of one or more of the first and second power switches in response to the number of times one or both of the first and second power switches are actuated.

4. The system of claim 1 where the cycle control is adapted to cycle between operation of one or more of the first and second power switches on a time period basis.

5. A system comprising:
an occupancy sensor disposed to detect a presence of an occupant in an area and to send a first control signal in response to detecting the presence of the occupant in the area;
a first power switch disposed to energize a first load in response to the first control signal and to de-energize the first load in response to a de-energize control signal; and
a second power switch disposed to energize a second load in response to a second control signal;
a delay element disposed to delay de-energizing the first load in response to the de-energize control;
a cycle control responsive to one of the first and second controls to cycle alternately between operation of the first and second power switches to designate which of the first and second loads acts as a primary load; and
where the first power switch is included in a power pack that is adapted to connect the first power switch to a building wiring system to control the flow of power from a source outside of the power pack to the first load.

6. The system of claim 5 further comprising a second power switch disposed to energize a second load in response to a second control.

7. The system of claim 6 where the power pack includes the second power switch and is adapted to connect the second power switch to the building wiring system to control the flow of power from a source outside of the power pack to the second load.

8. The system of claim 6 further comprising a second delay element disposed to delay de-energizing the second load in response to the de-energize control.

9. The system of claim 8 where the power pack includes logic disposed to implement the first and second delay elements.

10. A system comprising:
a first power switch disposed to energize a first lighting load arranged to serve a building space in response to a first control;
a second power switch disposed to energize a second lighting load arranged to serve the building space in response to a second control; and
a cycle control connected to the first and second power switches, the cycle control responsive to first and second control signals to cause the first and second power switches to cycle alternately between operation of one or more of the first and second loads to alternate which of the first and second lighting load acts as a primary load;
where the first and second power switches are included in one or more power packs;
where the one or more power packs are adapted to connect the first and second power switches to a building wiring system to control the flow of power from one or more sources outside of the one or more power packs to the first and second lighting loads; and
the first control comprises a manual-on control.

11. The system of claim 10 where the second control comprises a manual-on control.

12. The system of claim 10 where the second control comprises an automatic-on control.

13. The system of claim 12 where the first and second power switches are included in the same power pack.

14. The system of claim 13 further comprising a power supply included in the power pack to operate the first and second controls.

15. The system of claim 14 where:
the first control comprises a low-voltage wall switch; and
the second control comprises an occupancy sensor.

16. The system of claim 12 where the first and second power switches are disposed to be de-energized by an automatic-off control.

17. The system of claim 16 where the automatic-on and automatic-off controls comprise an occupancy sensor.

18. The system of claim 12 further comprising a manual-off override arranged to control the first power switch to de-energize the first lighting load.

19. The system of claim 12 further comprising a manual-on override arranged to control the second power switch to energize the second lighting load.

20. The system of claim 12 further comprising a power supply disposed within the one or more power packs to operate one or more of the manual-on and automatic-on controls.

* * * * *

UNITED STATES PATENT AND TRADEMARK OFFICE
CERTIFICATE OF CORRECTION

| | | |
|---|---|---|
| PATENT NO. | : 8,710,697 B2 | Page 1 of 1 |
| APPLICATION NO. | : 13/191271 | |
| DATED | : April 29, 2014 | |
| INVENTOR(S) | : Thomas W. Leonard et al. | |

It is certified that error appears in the above-identified patent and that said Letters Patent is hereby corrected as shown below:

In the Specification
In column 1, line 6, replace "divisional continuation" with --continuation--

Signed and Sealed this
First Day of March, 2016

Michelle K. Lee
*Director of the United States Patent and Trademark Office*